United States Patent
Satomi et al.

(10) Patent No.: US 11,390,218 B2
(45) Date of Patent: Jul. 19, 2022

(54) VEHICLE PERIPHERY MONITORING DEVICE, VEHICLE PERIPHERY MONITORING METHOD AND NON-TRANSITORY STORAGE MEDIUM

(71) Applicant: TOYOTA JIDOSHA KABUSHIKI KAISHA, Toyota (JP)

(72) Inventors: Yohei Satomi, Okazaki (JP); Tomoaki Iida, Okazaki (JP); Tomohito Higuma, Toyota (JP); Yuki Takahashi, Seto (JP); Jumpei Inagaki, Toyota (JP); Atsutoshi Sakaguchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/335,180

(22) Filed: Jun. 1, 2021

(65) Prior Publication Data
US 2021/0402927 A1 Dec. 30, 2021

(30) Foreign Application Priority Data

Jun. 26, 2020 (JP) .............................. JP2020-110607

(51) Int. Cl.
*B60R 1/12* (2006.01)
*B60R 11/04* (2006.01)

(52) U.S. Cl.
CPC ............... *B60R 1/12* (2013.01); *B60R 11/04* (2013.01); *B60R 2001/1215* (2013.01);
(Continued)

(58) Field of Classification Search
CPC ........ B60R 2300/303; B60R 2300/105; B60R 2001/1253; B60R 2001/1215;
(Continued)

(56) References Cited

U.S. PATENT DOCUMENTS

| 7,069,128 B2* | 6/2006 | Iwama | B62D 15/0245 |
| | | | 348/148 |
| 2007/0165108 A1* | 7/2007 | Yuasa | B60R 1/00 |
| | | | 348/148 |

(Continued)

FOREIGN PATENT DOCUMENTS

JP 2019102929 A 6/2019

*Primary Examiner* — Nathnael Aynalem
(74) *Attorney, Agent, or Firm* — Dickinson Wright, PLLC

(57) ABSTRACT

A vehicle periphery monitoring device includes a plurality of sensors including a rear camera, a rear right-side camera, and a rear left-side camera, a display unit that is provided inside a vehicle cabin, memory, and a processor that is coupled to the memory. The processor is configured so as to acquire a rear image that includes a first image of a vehicle rear side acquired by the rear camera, a second image of a vehicle rear right-side acquired by the rear right-side camera, and a third image of a vehicle rear left-side acquired by the rear left-side camera, acquire from the plurality of sensors relative positions of a target that is present in areas including the vehicle rear side, the vehicle rear right-side, and the vehicle rear left-side relative to a host vehicle, determine whether or not the acquired relative positions of the target are mutually consistent with each other in the plurality of sensors, display a single composite image that is created by combining the first image, the second image, and the third image at the display unit in a case in which it is determined that the relative positions of the target are mutually consistent with each other, and display the first image, the second image, and the third image individually and adjacently to each other on the display unit in a case in which it is determined that the relative positions of the target are not mutually consistent with each other.

18 Claims, 8 Drawing Sheets

(52) U.S. Cl.
CPC . *B60R 2001/1253* (2013.01); *B60R 2300/105* (2013.01); *B60R 2300/303* (2013.01); *B60R 2300/8026* (2013.01); *B60R 2300/8066* (2013.01)

(58) Field of Classification Search
CPC ..... B60R 11/04; B60R 1/26; B60R 2300/402; B60R 2300/8026; G06T 7/00; H04N 5/23238
USPC .......................................................... 348/148
See application file for complete search history.

(56) References Cited

U.S. PATENT DOCUMENTS

| | | | | |
|---|---|---|---|---|
| 2009/0079553 | A1* | 3/2009 | Yanagi | G01S 13/931 348/148 |
| 2016/0381303 | A1* | 12/2016 | Takami | H04N 9/735 348/223.1 |
| 2017/0282813 | A1* | 10/2017 | Hashimoto | G08G 1/166 |
| 2018/0086271 | A1* | 3/2018 | Kosugi | G06T 11/00 |
| 2018/0272940 | A1* | 9/2018 | Saeki | G06V 20/58 |
| 2020/0361382 | A1* | 11/2020 | Kondo | B60R 1/00 |

* cited by examiner

VEHICLE PERIPHERY MONITORING DEVICE, VEHICLE PERIPHERY MONITORING METHOD AND NON-TRANSITORY STORAGE MEDIUM

CROSS-REFERENCE TO RELATED APPLICATION

This application is based on and claims priority under 35 USC 119 from Japanese Patent Application No. 2020-110607 filed on Jun. 26, 2020, the disclosure of which is incorporated by reference herein.

BACKGROUND

Technical Field

The present disclosure relates to a vehicle periphery monitoring device, a vehicle periphery monitoring method, and a non-transitory storage medium.

Related Art

A video processing system that detects dirt or scratches or the like on a lens by comparing characteristic quantities of images in the same image acquisition range that have been acquired by a plurality of cameras is disclosed, for example, in Japanese Patent Application Publication Laid-Open (JP-A) No. 2019-102929. More specifically, this video processing system divides an image acquisition range of respective images acquired by a plurality of cameras into areas, and calculates the quantity of cumulative edges in each area. If the difference in the respective quantities of cumulative edges is greater than a predetermined threshold value, then it is determined that a foreign object is adhering to a lens.

However, in the video processing system disclosed in JP-A No. 2019-102929, because it is not possible to detect any misalignment of the camera mounting positions, if a composite image is displayed on a display unit inside a vehicle cabin, there is a possibility that incorrect composite images containing positionally misaligned images will be displayed.

SUMMARY

The present disclosure provides a vehicle periphery monitoring device that, in a structure that displays composite images, inhibits composite images that are incorrect because of camera misalignment from being displayed.

A vehicle periphery monitoring device of a first aspect has a rear image acquisition unit that acquires rear images including a first image of a vehicle rear side acquired by a rear camera, a second image of a vehicle rear right-side acquired by a rear right-side camera, and a third image of a vehicle rear left-side acquired by a rear left-side camera, a target position acquisition unit that acquires from a plurality of sensors including the rear camera, the rear right-side camera and the rear left-side camera relative positions of a target present in areas including the vehicle rear side, the vehicle rear right-side, and the vehicle rear left-side relative to its own host vehicle, a target position determination unit that determines whether or not the relative positions of the target acquired by the target position acquisition unit are mutually consistent with each other in the plurality of sensors, and a display processing unit that, in a case in which it is determined by the target position determination unit that the relative positions of the target are mutually consistent with each other, displays a single composite image that is created by combining the first image, the second image, and the third image at a display unit provided in a vehicle cabin, and that, in a case in which it is determined by the target position determination unit that the relative positions of the target are not mutually consistent with each other, displays the first image, the second image, and the third image individually and adjacently to each other on the display unit.

In the vehicle periphery monitoring device according to the first aspect, a rear image acquisition unit acquires a rear image that includes a first image of a vehicle rear side, a second image of a vehicle rear right-side, and a third image of a vehicle rear left-side. Here, the first image is an image acquired by a rear camera. Moreover, the second image is an image acquired by a rear right-side camera, and the third image is an image acquired by a rear left-side camera.

The target position acquisition unit acquires from a plurality of sensors including the rear camera, the rear right-side camera and the rear left-side camera relative positions, relative to its own host vehicle, of a target present in areas including the vehicle rear side, the vehicle rear right-side, and the vehicle rear left-side. In addition, a target position determination unit determines whether or not the relative positions of the target, relative to its own host vehicle, acquired by the target position acquisition unit are mutually consistent with each other in the plurality of sensors. Furthermore, a display processing unit displays the first image, the second image, and the third image on a display unit provided in a vehicle cabin.

Here, in a case in which it is determined by the target position determination unit that the relative positions of the target, relative to its own host vehicle, are mutually consistent in the plurality of sensors, the display processing unit displays at the display unit a single composite image that is created by combining the first image, the second image, and the third image. As a result, a vehicle occupant is able to easily recognize the position of a target traveling at the rear of their own vehicle.

On the other hand, in a case in which it is determined by the target position determination unit that the relative positions of the target, relative to its own host vehicle, are not mutually consistent in the plurality of sensors, the display processing unit displays the first image, the second image, and the third image individually and adjacently to each other on the display unit. In this way, in a case in which the mounting position of any one of the rear camera, the rear right-side camera, or the rear left-side camera becomes out of alignment, by displaying the individual images on the display unit, a composite image containing positionally misaligned images does not get displayed on the display unit.

Note that the term 'composite image' referred to here is an image that is created by performing image processing on each of the first image, the second image, and the third image such that the first image, the second image, and the third image are combined together into a single seamless image.

A vehicle periphery monitoring device of a second aspect is characterized in that, in the first aspect, the target position acquisition unit acquires the relative positions of the target from three or more sensors including the rear camera, the rear right-side camera and the rear left-side camera.

In the vehicle periphery monitoring device of the second aspect, by acquiring the relative positions of the target relative to a host vehicle from three or more sensors, the detection accuracy when detecting the relative positions of the target can be improved compared to a structure in which the relative positions of the target relative to a host vehicle are acquired from two or fewer sensors.

A vehicle periphery monitoring device of a third aspect is characterized in that, in the second aspect, there is further provided an enhanced display unit that provides an enhanced display of a target approaching the host vehicle in an image displayed on the display unit.

In the vehicle periphery monitoring device of the third aspect, by providing an enhanced display of a target approaching their vehicle, it is possible to draw the attention of a vehicle occupant to the target.

A vehicle periphery monitoring device of a fourth aspect is characterized in that, in the third aspect, in a case in which only the relative position of the target detected by just one sensor among the three or more sensors is not consistent in the target information determination unit, the enhanced display unit provides an enhanced display on the display unit based on a relative positions of the target acquired from the remaining sensors after the information from the one sensor has been excluded.

In the vehicle periphery monitoring device of the fourth aspect, by providing an enhanced display based on a relative positions of the target acquired from the remaining sensors, it is possible to provide an enhanced display at the correct position of the target. In other words, because there is a possibility that the mounting position of a sensor having a relative position of the target that is not consistent with those of the other sensors has become misaligned, it is possible to inhibit an enhanced display being provided at an incorrect position due to information from the misaligned sensor being included.

A vehicle periphery monitoring device of a fifth aspect is characterized in that, in the third aspect, in a case in which the relative positions of the target detected by all of the sensors among the three or more sensors are all c in the target position determination unit, the enhanced display unit provides an enhanced display based on the relative position of the target acquired from the sensor having a relative position of the target that is detected as being closest to the host vehicle.

In the vehicle periphery monitoring device of the fifth aspect, by providing an enhanced display based on the relative position of the target acquired from the sensor having a detected relative position of the target that is the closest to the host vehicle, information having a high degree of urgency can be conveyed to a vehicle occupant.

A vehicle periphery monitoring device of a sixth aspect is characterized in that, in the fourth aspect, in a case in which only the relative position of the target detected by any one sensor among the rear camera, the rear right-side camera and the rear left-side camera is not consistent with the other relative positions in the target position determination unit, warning content is displayed on the display unit superimposed on the rear image acquired by the one sensor.

In the vehicle periphery monitoring device of the sixth aspect, by displaying warning content superimposed on the rear image acquired by the sensor having a mounting position has a possibility of being misaligned, it is possible to alert a vehicle occupant as to this possibility.

A vehicle periphery monitoring device of a seventh aspect is characterized in that, in the fifth aspect, in a case in which the relative positions of the target detected by the rear camera, the rear right-side camera and the rear left-side camera are all mutually different from each other in the target position determination unit, warning content is displayed superimposed on all of the images of the first image, the second image, and the third image which correspond to those sensors that have detected the target.

In the vehicle periphery monitoring device of the seventh aspect, because warning content is displayed superimposed on a plurality of images, it is possible to encourage a vehicle occupant to make a vehicle inspection or the like.

A vehicle periphery monitoring device of an eighth aspect is characterized in that, in any one of the first through seventh aspects, the target position acquisition unit acquires the relative positions of the target from the sensors that include radar units that are provided in corner portions of a vehicle body rear portion and detect obstacles at the rear of the vehicle.

In the vehicle periphery monitoring device of the eighth aspect, by detecting a relative position of a target using obstacle detection radar, there is no need to install dedicated sensors so that an increase in the number of components is inhibited.

As has been described above, according to the vehicle periphery monitoring device according to the present disclosure, it is possible, in a structure that displays composite images, to inhibit composite images that are incorrect because of camera misalignment from being displayed.

BRIEF DESCRIPTION OF THE DRAWINGS

Exemplary embodiments of the present disclosure will be described in detail based on the following figures, wherein.

DETAILED DESCRIPTION

A vehicle periphery monitoring device 10 according to an exemplary embodiment will now be described with reference to the drawings.

(Hardware Structure of the Vehicle Periphery Monitoring Device 10)

Figure 1:
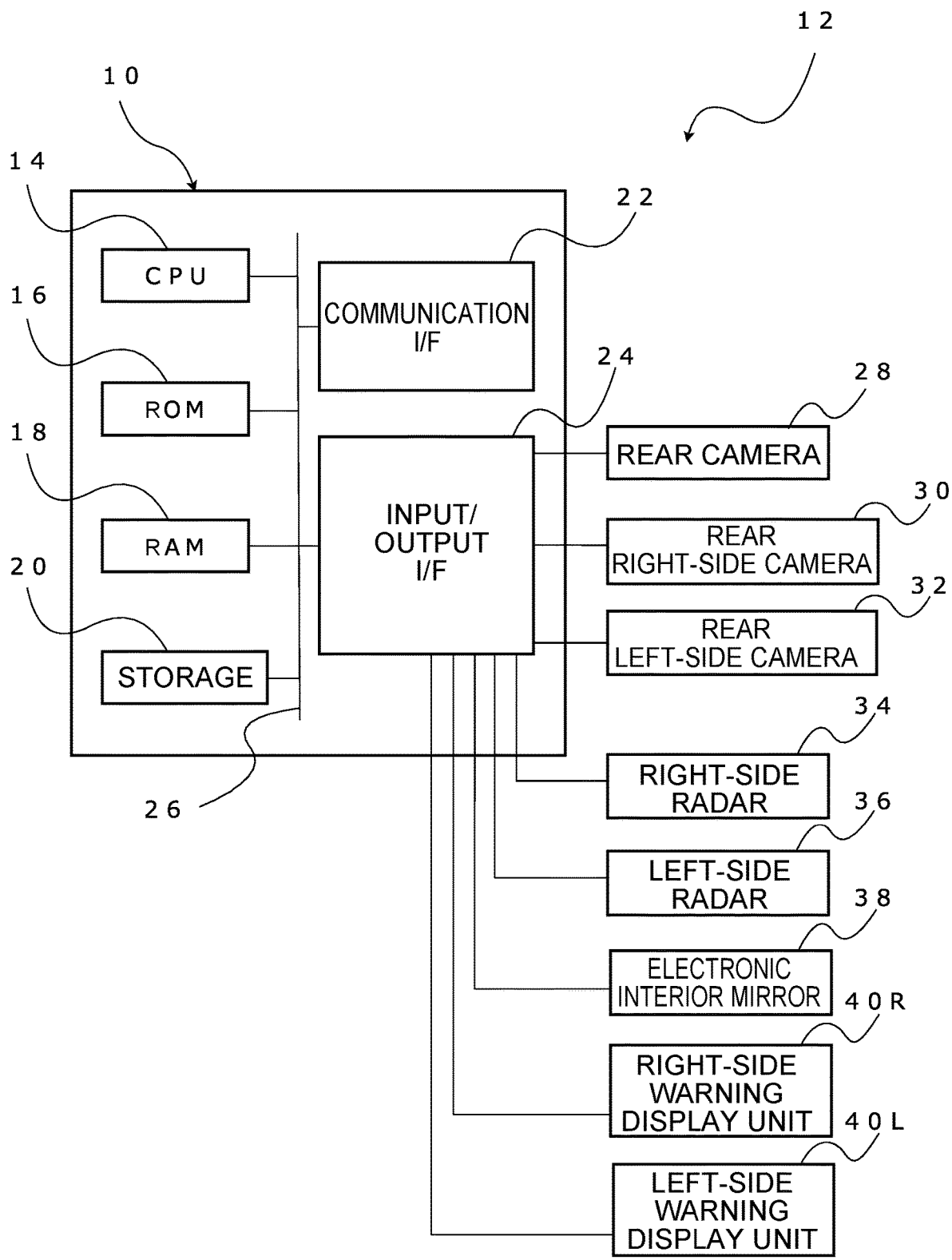
FIG. 1 is a block diagram showing a hardware structure of a vehicle periphery monitoring device according to an exemplary embodiment.

As is shown in FIG. 1, the vehicle periphery monitoring device 10 of the present exemplary embodiment is configured so as to include a CPU (Central Processing Unit) 14, ROM (Read Only Memory) 16, RAM (Random Access memory) 18, storage 20, a communication interface 22, and an input/output interface 24. Each of these structures is connected via a bus 26 so as to be able to mutually communicate with the other structures. As an example, the vehicle periphery monitoring device 10 of the present exemplary embodiment forms part of an ECU (Electronic Control Unit) that is mounted in a vehicle 12.

The CPU 14 which is serving as a processor is a central processing unit, and performs tasks such as executing various types of programs, and controlling various units. In other words, the CPU 14 reads programs from the ROM 16, which is serving as memory, or from the storage 20, which is also serving as memory, and executes these programs using the RAM 18 as a work area. The CPU 14 performs the aforementioned control of the various structures and various types of computation processing in accordance with the programs stored in the ROM 16 or the storage 20.

The ROM 16 stores various types of programs and various types of data. The RAM 18 serves as a work area and temporarily stores programs or data. The storage 20 is formed by an HDD (Hard Disk Drive) or an SSD (Solid State Drive), and is a non-transient storage medium that stores various types of programs including operating systems, and various types of data. In the present exemplary embodiment, a display program and the like that is used to display a composite image is stored in the ROM 16 or in the storage 20.

The communication interface 22 is an interface that the vehicle periphery monitoring device 10 uses to perform communication via a computer network, and a Standard such as, for example, 5G LTE, Wi-Fi (Registered Trademark), or Ethernet (Registered Trademark) is used for this communication.

A rear camera 28, a rear right-side camera 30, a rear left-side camera 32, a right-side radar 34, a left-side radar 36, an electronic interior mirror 38 which serves as a display unit, a right-side warning display unit 40R and a left-side warning display unit 40L are connected to the input/output interface 24. The rear camera 28, the rear right-side camera 30, the rear left-side camera 32, the left-side radar 34, and the right-side radar 36 each correspond to a 'sensor' according to the present disclosure.

Figure 2:
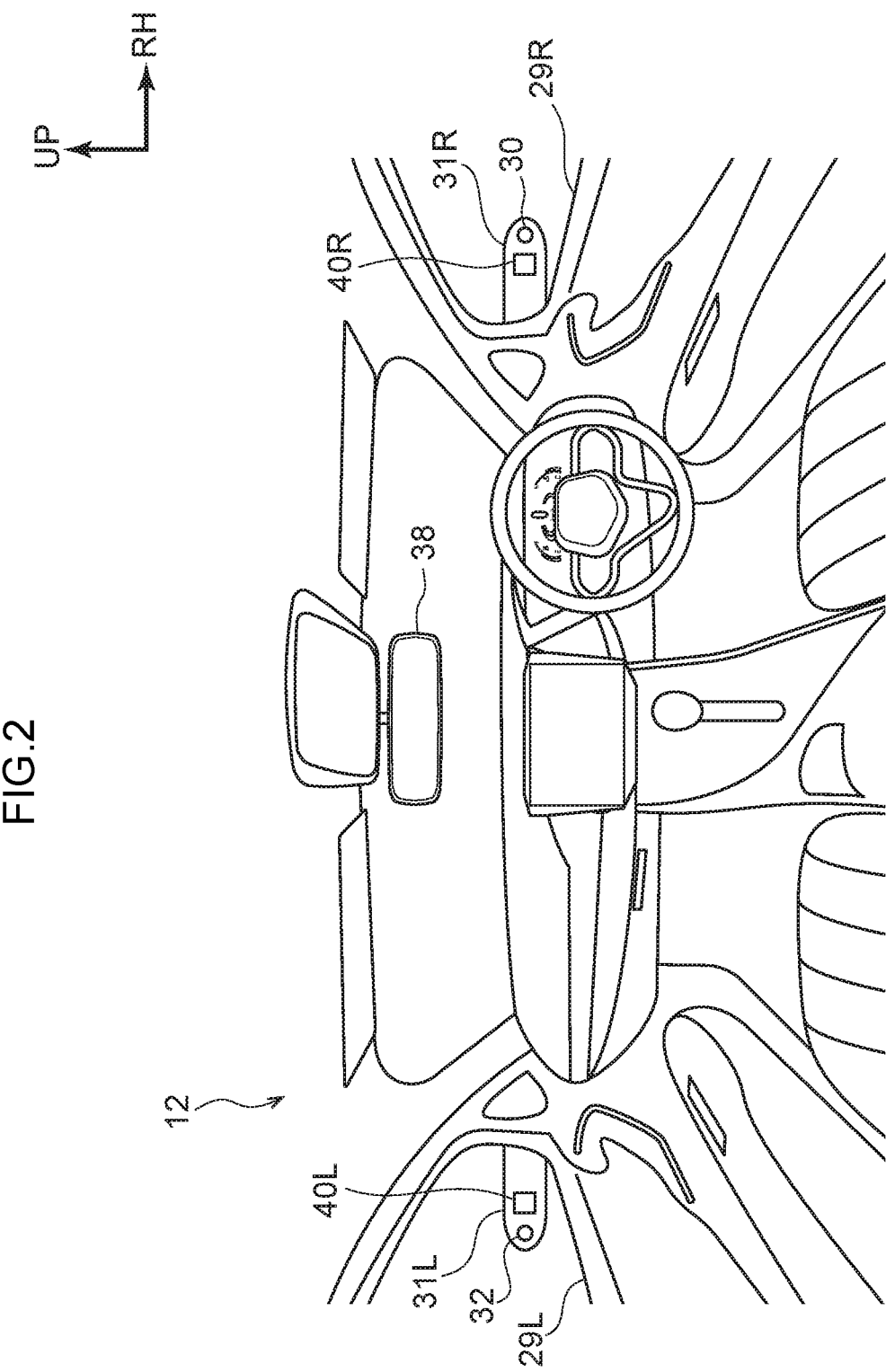
FIG. 2 is a view as seen from a vehicle rear side of a front portion of a vehicle cabin interior of a vehicle provided with the vehicle periphery monitoring device according to the exemplary embodiment.

As is shown in FIG. 2, a right side-door 29R is disposed at the right side of the vehicle 12, and a right camera-support portion 31R is provided on an outer surface of a front-end portion of the right side-door 29R. The right camera-support portion 31R protrudes towards the vehicle right side from the right side-door 29R, and the rear right-side camera 30 is mounted facing towards the vehicle rear side on a right-side end portion of the right camera-support portion 31R.

In contrast, a left side-door 29L is disposed at the left side of the vehicle 12, and a left camera-support portion 31L is provided on an outer surface of a front-end portion of the left side-door 29L. The left camera-support portion 31L protrudes towards the vehicle left side from the left side-door 29L, and the rear left-side camera 32 is mounted facing towards the vehicle rear side on a left-side end portion of the left camera-support portion 31L.

Figure 3:
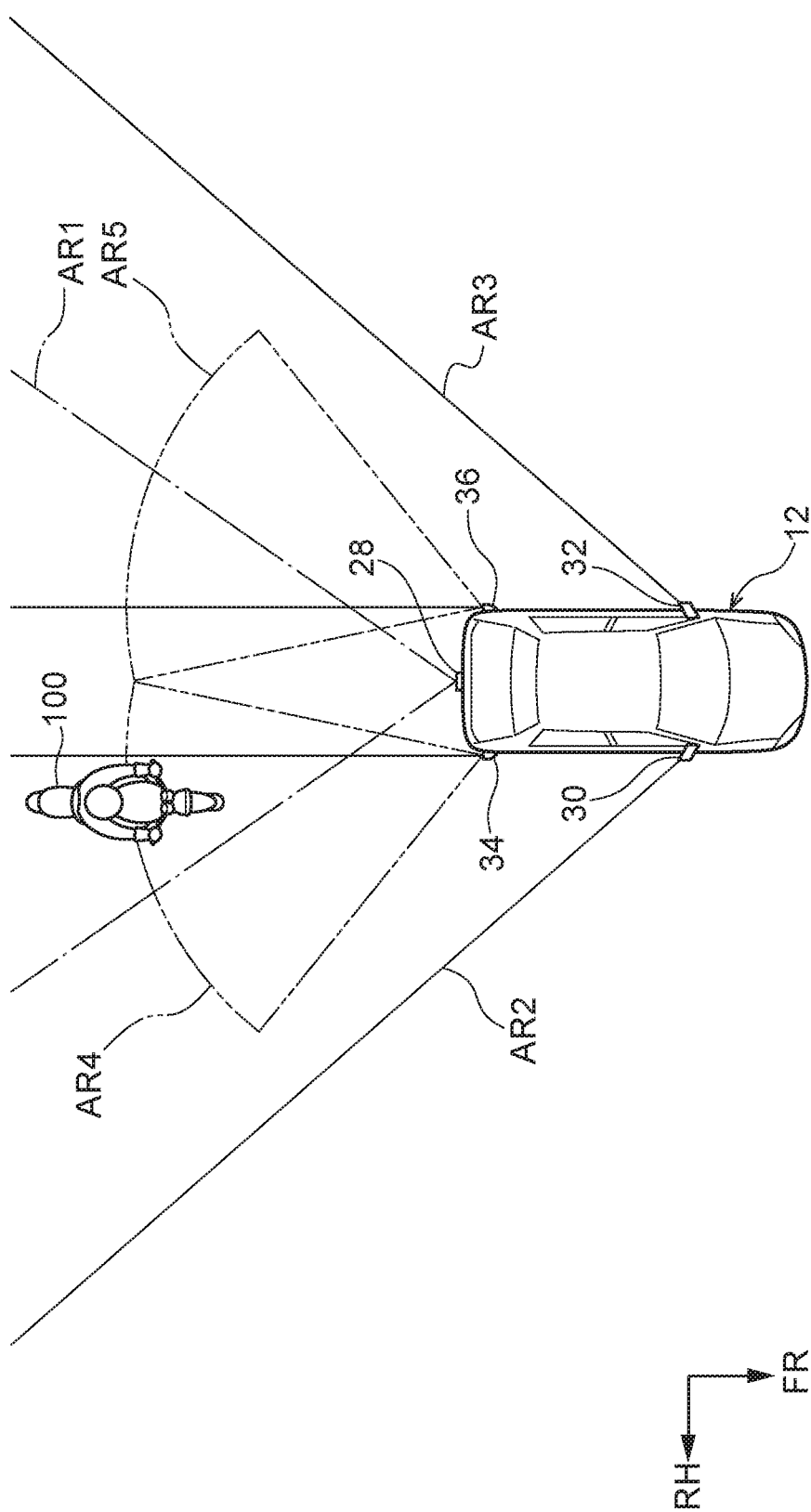
FIG. 3 is a plan view showing a vehicle provided with the vehicle periphery monitoring device according to the exemplary embodiment, and a motorcycle traveling behind this vehicle.

As is shown in FIG. 3, the rear right-side camera 30 is mounted on the right side of the vehicle 12, and the rear left-side camera 32 is mounted on the left side of the vehicle 12. An example of an image acquisition range of the rear right-side camera 30 is an area indicated by solid lines AR2 in FIG. 3. The image acquisition range AR2 is an area bounded by a straight line extending from the rear right-side camera 30 along the right side of the vehicle 12 towards the vehicle rear, and a straight line extending from the rear right-side camera 30 diagonally rearwards and towards the right side.

In addition, an example of an image acquisition range of the rear left-side camera 32 is an area indicated by solid lines AR3 in FIG. 3. The image acquisition range AR3 is an area bounded by a straight line extending from the rear left-side camera 32 along the left side of the vehicle 12 towards the vehicle rear, and a straight line extending from the rear left-side camera 32 diagonally rearwards and towards the left side.

The rear camera 28 is mounted facing towards the vehicle rear side in a central portion in a vehicle width direction of a rear end portion of the vehicle 12, and acquires images of the area behind the vehicle. An example of an image acquisition range of the rear camera 28 is an area indicated by single-dot chain lines AR1 in FIG. 3. The image acquisition range AR1 is an area that spreads out progressively wider towards the left and right sides the further away it is from the rear end portion of the vehicle 12.

The right-side radar 34 is mounted on a right corner portion of a vehicle body rear portion of the vehicle 12, and is a radar unit that detects obstacles to the rear of the vehicle. An example of a detection range of the right-side radar 34 is an area indicated by double-dot chain lines AR4 in FIG. 3. The detection range AR4 is a fan-shaped area centered on the right-side radar 34, and is set as an area that spans the space between the image acquisition range AR1 of the rear camera 28 and the image acquisition range AR2 of the rear right-side camera 30.

The left-side radar 36 is mounted on a left corner portion of the vehicle body rear portion of the vehicle 12, and is a radar unit that detects obstacles to the rear of the vehicle. An example of a detection range of the left-side radar 36 is an area indicated by double-dot chain lines AR5 in FIG. 3. The detection range AR5 is a fan-shaped area centered on the left-side radar 36, and is set as an area that spans the space between the image acquisition range AR1 of the rear camera 28 and the image acquisition range AR3 of the rear left-side camera 32.

Figure 6:
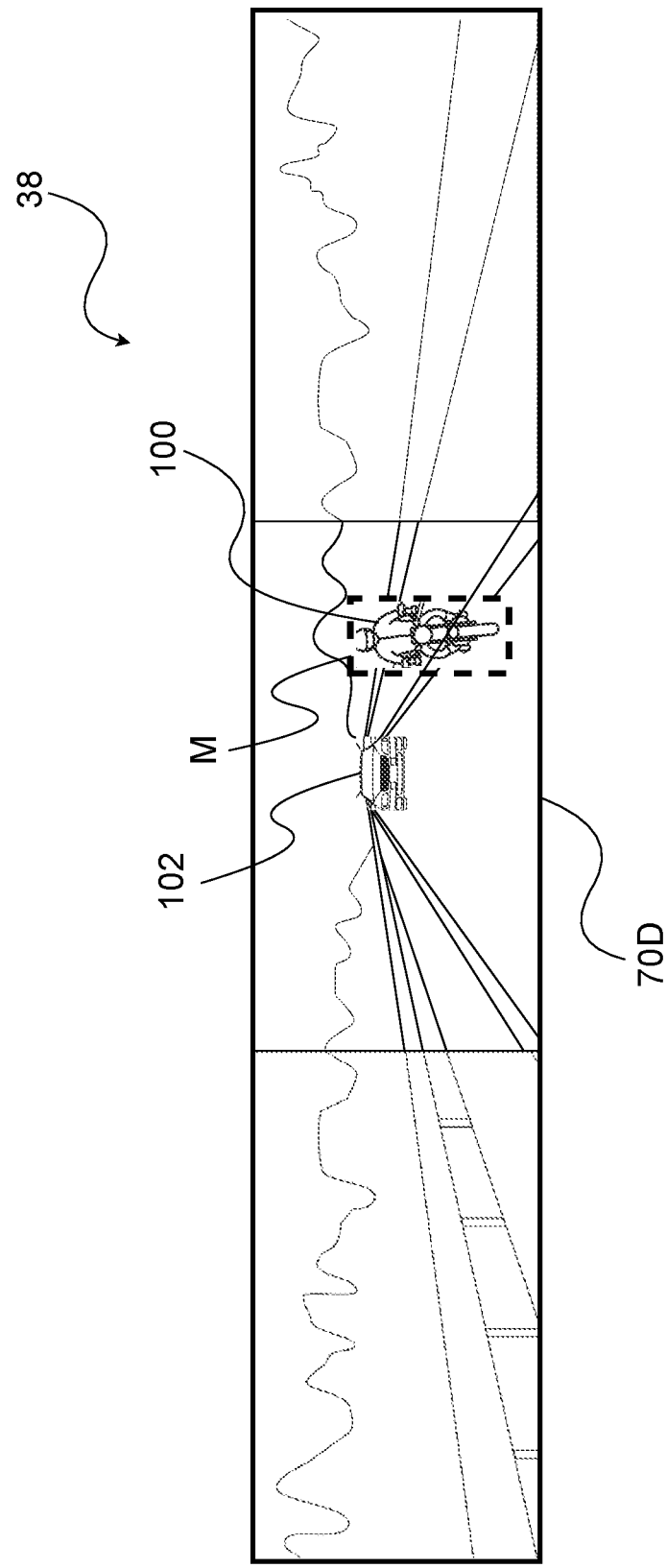
FIG. 6 is a view showing an example of an image being displayed on an electronic interior mirror of the exemplary embodiment, and shows a composite image being displayed.
Figure 7:
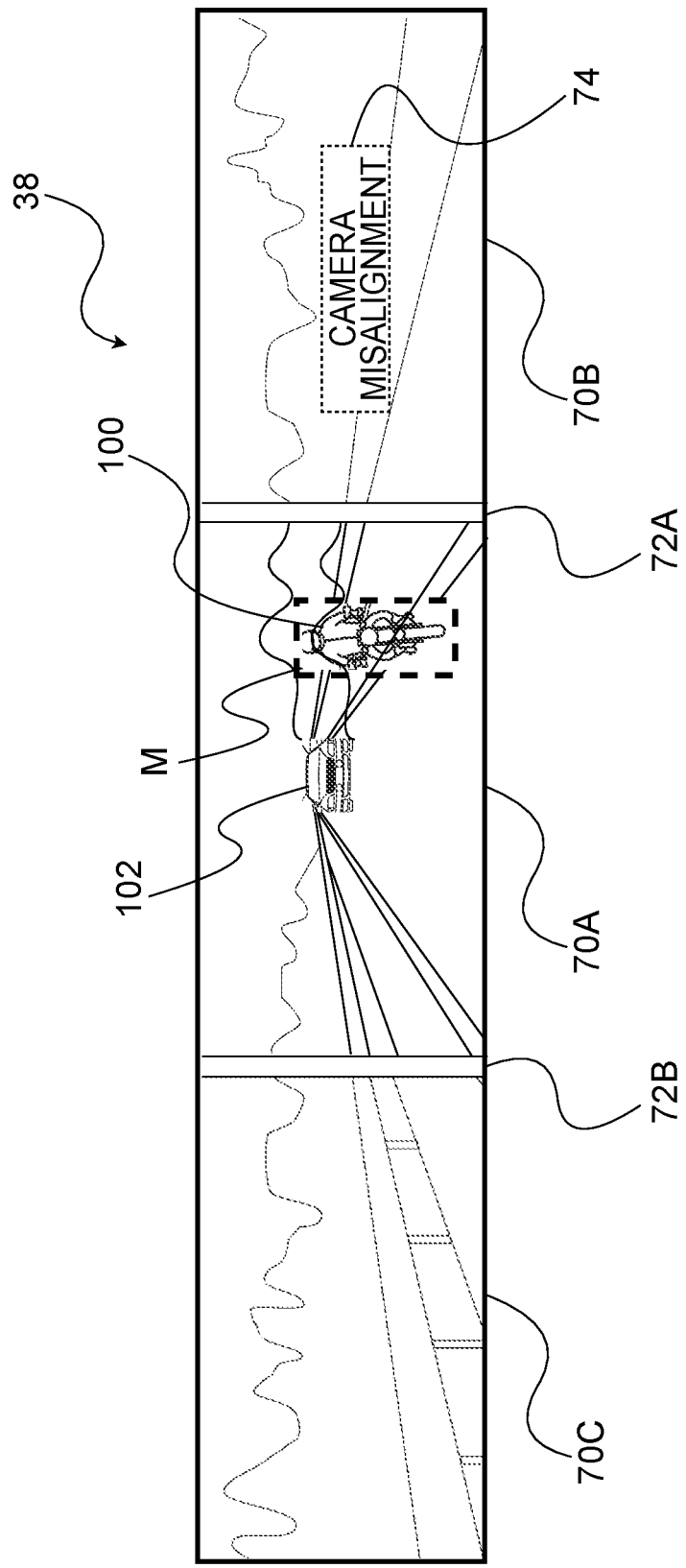
FIG. 7 is a view showing an example of an image being displayed on an electronic interior mirror of the exemplary embodiment, and shows an example of a state in which a mounting position of a rear right-side camera has become misaligned.

As is shown in FIG. 2, the electronic interior mirror 38 is formed by an LCD panel, and is able to display images to vehicle occupants. Moreover, as is shown in FIG. 7, a first image 70A of the area to the vehicle rear that is acquired by the rear camera 28, a second image 70B that is acquired by the rear right-side camera 30, and a third image 70C that is acquired by the rear left-side camera 32 are displayed on the electronic interior mirror 38. Furthermore, as is shown in FIG. 6, it is also possible for a composite image 70D that is formed by combining together the first image 70A, the second image 70B, and the third image 70C to be displayed on the electronic interior mirror 38. In this way, the electronic interior mirror 38 functions as a replacement for an interior rear-view mirror so that, by viewing images displayed on the electronic interior mirror 38, a vehicle occupant is able to ascertain the situation over a wide area at the rear of the vehicle 12.

A right-side warning display unit 40R is provided in the right camera-support portion 31R. The right-side warning display unit 40R is a display unit that is visible to a vehicle occupant and displays a warning when an approach of an obstacle from the rear right-side direction of the vehicle is detected by the right-side radar 34.

A left-side warning display unit 40L is provided in the left camera-support portion 31L. The left-side warning display unit 40L is a display unit that is visible to a vehicle occupant and displays a warning when an approach of an obstacle from the rear left-side direction of the vehicle is detected by the left-side radar 36.

(Function Structure of the Vehicle Periphery Monitoring Device 10)

The vehicle periphery monitoring device 10 is able to perform various types of functions using the above-described hardware resources. The function structure achieved by the vehicle periphery monitoring device 10 will now be described with reference to FIG. 4.

Figure 4:
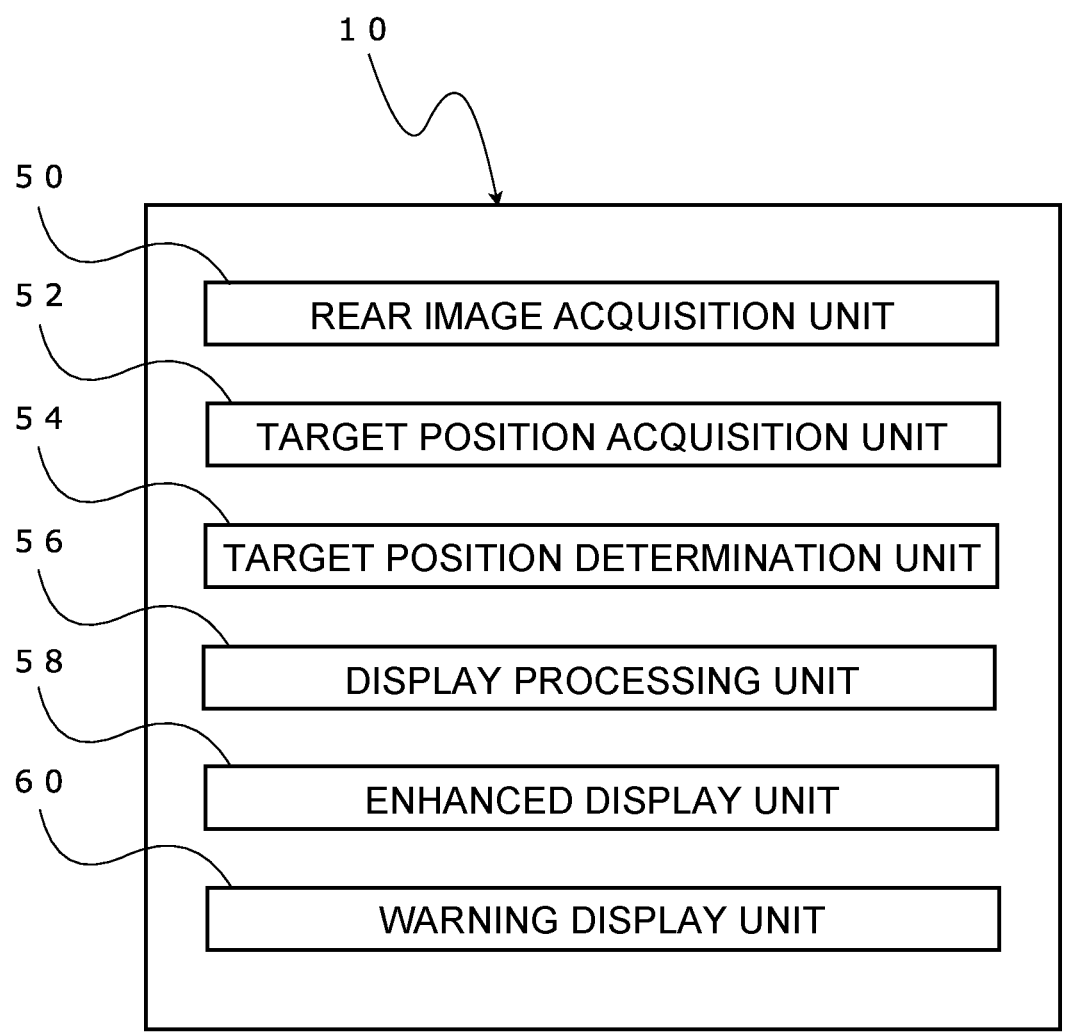
FIG. 4 is a block diagram showing a function structure of the vehicle periphery monitoring device according to the exemplary embodiment.

As is shown in FIG. 4, the vehicle periphery monitoring device 10 is configured so as to include a rear image acquisition unit 50, a target position acquisition unit 52, a target position determination unit 54, a display processing unit 56, an enhanced display unit 58, and a warning display unit 60 as function structures. Each function structure is achieved as a result of the CPU 14 reading a program stored in the ROM 16 or the storage 20 and then executing this program.

The rear image acquisition unit 50 acquires rear images including the first image 70A of the area to the vehicle rear that is acquired by the rear camera 28, the second image 70B of the area to the rear right-side of the vehicle that is acquired by the rear right-side camera, and the third image 70C of the area to the rear left-side of the vehicle that is acquired by the rear left-side camera.

The target position acquisition unit 52 acquires the relative positions relative to the vehicle 12 of a target that is present in areas including the area to the vehicle rear, the area to the rear right-side of the vehicle, and the area to the rear left-side of the vehicle from a plurality of sensors including the rear camera 28, the rear right-side camera 30, and the rear left-side camera 32. As an example, in the present exemplary embodiment, the target position acquisition unit 52 acquires the relative positions of the target relative to the vehicle 12 by acquiring signals from the right-side radar 34 and the left-side radar 36 in addition to the rear camera 28, the rear right-side camera 30, and the rear left-side camera 32.

In the present exemplary embodiment, if the vehicle 12 is looked at in a plan view, the coordinates of the target are acquired taking a center portion in the vehicle width direction of the rear end portion of the vehicle 12 as a reference position. For example, as is shown in FIG. 3, in a case in which a motorcycle 100 is approaching the vehicle 12 from a rear right-side direction, this motorcycle 100 travels through an area where the image acquisition range AR1 of the rear camera 28 and the image acquisition range AR2 of the rear right-side camera 30 mutually overlap. In addition, the motorcycle 100 also travels through the detection range AR4 of the right-side radar 34. At this time, the target position acquisition unit 52 calculates the relative position of the motorcycle 100 based on the first image 70A that was acquired by the rear camera 28, and then acquires the coordinates of the motorcycle 100 relative to the reference position by correcting the result of this calculation. In the same way, the target position acquisition unit 52 calculates the relative position of the motorcycle 100 based on the second image 70B that was acquired by the rear right-side camera 30, and then acquires the coordinates of the motorcycle 100 relative to the reference position by correcting the result of this calculation. Furthermore, the target position acquisition unit 52 also corrects the relative position of the motorcycle 100 that was detected by the right-side radar 34, and then acquires the coordinates of the motorcycle 100 relative to the reference position. For this reason, if all of the sensors are mounted in their proper positions, then the coordinates of the motorcycle 100 that have been acquired at the same timings by the target position acquisition unit 52 are all the same coordinates.

As is shown in FIG. 4, the target position determination unit 54 determines whether or not the relative positions of the target acquired by the target position acquisition unit 52 are consistent in the plurality of sensors. More specifically, in the example shown in FIG. 3, the target position determination unit 54 determines whether or not the coordinates of the motorcycle 100 that have been acquired at the same timings by the target position acquisition unit 52 from the three sensors, namely, the rear camera 28, the rear right-side camera 30, and the right-side radar 34 are mutually consistent with each other.

As is shown in FIG. 4, in a case in which it is determined by the target position determination unit 54 that the relative positions of the target are mutually consistent with each other, then as is shown in FIG. 6, the display processing unit 56 combines the first image 70A, the second image 70B, and the third image 70C into the single composite image 70D and displays this at the electronic interior mirror 38. The composite image 70D is a composite image formed by performing image processing respectively on the first image 70A, the second image 70B, and the third image 70C, and is displayed with their viewing angles appropriately changed so that the first image 70A, the second image 70B, and the third image 70C are combined together into a single seamless image. To achieve this, in the composite image 70D, the boundary between the first image 70A and the second image 70B, and the boundary between the first image 70A and the third image 70C are moved appropriately to the right or left.

In contrast, in a case in which it is determined by the target position determination unit 54 that the relative positions of the target are not mutually consistent with each other, then as is shown in FIG. 7, the display processing unit 56 displays the first image 70A, the second image 70B, and the third image 70C as separate individual images adjacently to each other on the electronic interior mirror 38. In a case in which the first image 70A, the second image 70B, and the third image 70C are displayed adjacently to each other as individual images, a first partition area 72A is provided between the first image 70A and the second image 70B, and a second partition area 72B is provided between the first image 70A and the third image 70C. By providing the first partition area 72A and the second partition area 72B in this way, a vehicle occupant is made visually aware that the first image 70A, the second image 70B, and the third image 70C have not been combined into a composite image. Note that, in the present exemplary embodiment, as an example, in a case in which the first image 70A, the second image 70B, and the third image 70C are displayed adjacently to each other as individual images, the respective images each have a fixed display range. In other words, the positions of the first partition area 72A and the second partition area 72B are fixed, and the first image 70A is displayed between the first partition area 72A and the second partition area 72B. In addition, the second image 70B is displayed on the right side of the first partition area 72A, and the third image 70C is displayed on the left side of the second partition area 72B.

As is shown in FIG. 4, the enhanced display unit 58 provides an enhanced display of the target approaching the vehicle 12 in the image displayed on the display processing unit 56. In the present exemplary embodiment, as an example, as is shown in FIG. 6, in a case in which the motorcycle 100 is approaching the vehicle 12, an enhanced display is provided by displaying a frame-shaped mark M superimposed on the position of the motorcycle 100 in the composite image 70D. Because a following vehicle 102 is following at a sufficient distance from the vehicle 12, an enhanced display of the following vehicle 102 is not provided.

Here, the enhanced display unit 58 of the present exemplary embodiment changes the method used to calculate the relative position of the target to be displayed as an enhanced image in accordance with preconditions. More specifically, in a case in which only the relative position of the target detected by just one sensor among the three or more sensors is determined in the target position determination unit 54 to not be consistent with the other relative positions, the enhanced display unit 58 provides an enhanced display based on a relative positions of the target acquired from the other sensors with the information from the inconsistent sensor being excluded.

For example, as is shown in FIG. 3, a case in which the relative positions of the motorcycle 100 are detected by the rear camera 28, the rear right-side camera 30, and the right-side radar 34 will now be considered. In this state, in a case in which the relative position of the motorcycle 100 as detected by the rear right-side camera 30 is not consistent with the relative positions detected by the other sensors (i.e., by the rear camera 28 and the right-side radar 34), the enhanced display unit 58 provides an enhanced display at a position that is calculated based on a relative positions detected by the rear camera 28 and the right-side radar 34. In other words, a structure is employed in which, by excluding the information about the relative position of the motorcycle 100 detected by the rear right-side camera 30, data having a high probability of being erroneous is excluded.

Moreover, in a case in which the relative positions of the target detected by all of the sensors among the three or more sensors are all mutually different from each other in the target position determination unit 54, the enhanced display unit 58 of the present exemplary embodiment provides an enhanced display based on the relative position of the target acquired from the particular sensor having a detected relative position of the target that is the closest to the vehicle 12.

For example, as is shown in FIG. 3, a case in which the relative positions of the motorcycle 100 are detected by the rear camera 28, the rear right-side camera 30, and the right-side radar 34 will be considered. In this state, in a case in which the relative positions detected by all of the sensors are mutually different from each other, and the relative position of the motorcycle 100 detected by the right-side radar 34 is the closest to the vehicle 12, the enhanced display unit 58 provides an enhanced display based on the relative position of the motorcycle 100 acquired from the right-side radar 34.

As is shown in FIG. 4, the warning display unit 60 displays warning content superimposed on the rear image at the electronic interior mirror 38. More specifically, in a case in which only the relative position of the target detected by any one sensor among the rear camera 28, the rear right-side camera 32, and the right-side radar 34 is determined in the target position determination unit 54 to not be consistent with the other relative positions, the warning display unit 60 displays superimposed warning content.

For example, in a case in which only the relative position of the target detected by the rear right-side camera 30 is not consistent with the other relative positions, as is shown in FIG. 7, the warning display unit 60 displays the warning content 74 superimposed on the second image 70B acquired by the rear right-side camera 30 on the electronic interior mirror 38. Here, by displaying 'camera misalignment' as the warning content, the suggestion is made to a vehicle occupant that there is a possibility that the relative position of the target displayed in the second image 70B has not been correctly detected. Moreover, in a case in which only the relative position of the target detected by the right-side radar 34 is not consistent with the other relative positions, it is also possible to provide a display indicating that there is a fault with the right-side radar on a center display or the like installed in the instrument panel instead of providing a warning display on the right-side warning display unit 40R (see FIG. 2). Note that the warning display unit 60 may be in the form of different warning content such as an icon or the like that are displayed superimposed on a display unit.

Moreover, in a case in which the relative positions of the target detected by the rear camera 28, the rear right-side camera 30, and the rear left-side camera 34 are all mutually different from each other in the target position determination unit 54, the warning display unit 60 displays warning content superimposed on all of the images of the first image 70A, the second image 70B, and the third image 70C that correspond to sensors detecting the target.

Figure 8:
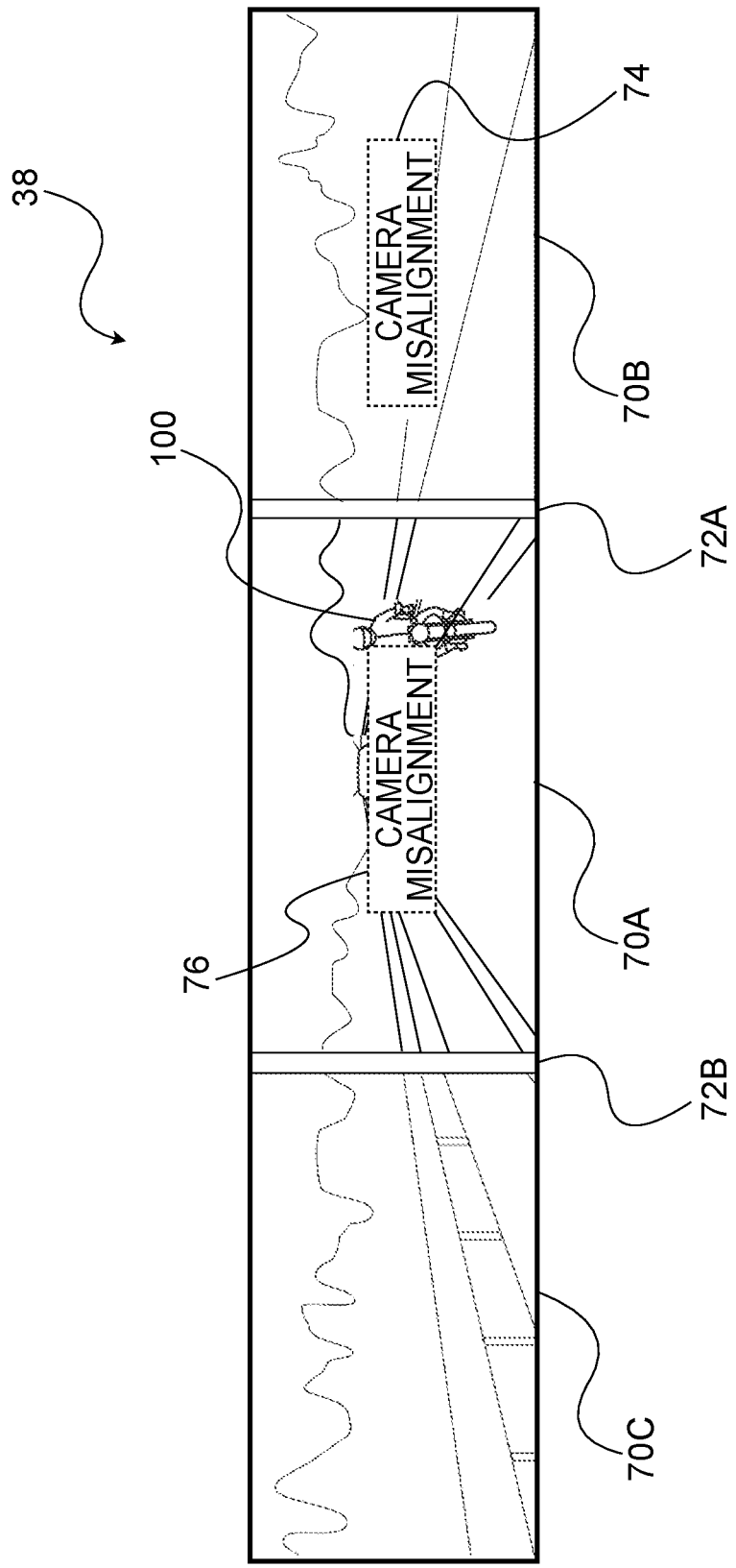
FIG. 8 is a view showing an example of an image being displayed on an electronic interior mirror of the exemplary embodiment, and shows an example of a state in which mounting positions of a rear camera and a rear right-side camera have become misaligned.

For example, in a case in which the relative positions of the motorcycle 100 are detected by the rear camera 28 and the rear right-side camera 30, as is shown in FIG. 8, the warning display unit 60 displays the warning content 76 superimposed on the first image 70A, which corresponds to the rear camera 28, at the electronic interior mirror 38. In the same way, the warning display unit 60 displays the warning content 74 superimposed on the second image 70B, which corresponds to the rear right-side camera 30, at the electronic interior mirror 38. In the present exemplary embodiment, as an example, the contents of the warning contents 74 and the warning contents 76 are both the same, however, it is also possible for other warning content to be displayed.

(Actions)

Next, actions of the present exemplary embodiment will be described.

(Example of the Display Processing)

Figure 5:
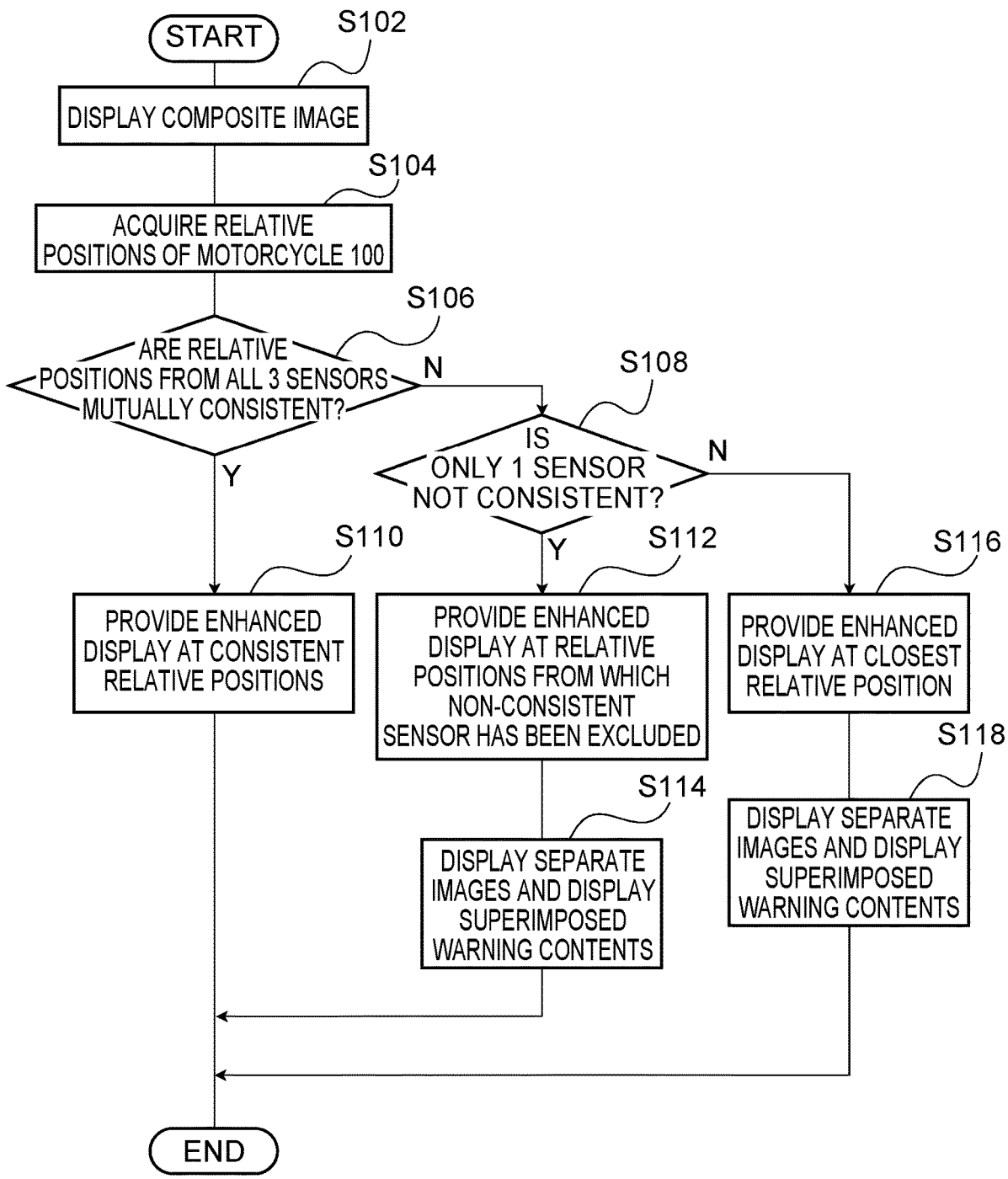
FIG. 5 is a flowchart showing an example of a flow of display processing of the exemplary embodiment.

FIG. 5 is a flowchart showing an example of the flow of display processing performed by the vehicle periphery monitoring device 10. This display processing is executed as a result of the CPU 14 reading a program from the ROM 16 or storage 20, and then expanding and executing this program. Note that, as an example, in the flowchart described below, as is shown in FIG. 3, a state in which the motorcycle 100, which is serving as the target, is detected by the rear camera 28, the rear right-side camera 30, and the right-side radar 34.

As is shown in FIG. 5, in step S102, the CPU 14 displays a composite image on the electronic interior mirror 38. More specifically, utilizing the functions of the display processing unit 56, the CPU 14 displays the composite image 70D, which is created by combining the first image 70A acquired by the rear camera 28, the second image 70B which is created by the rear right-side camera 30, and the third image which is acquired by the rear left-side camera 32, on the electronic interior mirror 38 (see FIG. 6).

In step S104, the CPU acquires the relative positions of the motorcycle 100. More specifically, utilizing the functions of the target position acquisition unit 52, the CPU 14 acquires the relative positions of the motorcycle 100 relative to the vehicle 12 by acquiring signals from the rear camera 28, the rear right-side camera 30, and the right-side radar 34.

In step S106, the CPU 14 determines whether or not the relative positions from the three sensors are mutually consistent with each other. More specifically, utilizing the functions of the target position determination unit 54, the CPU 14 determines whether or not the coordinates of the motorcycle 100 that have been acquired at the same timings from the three sensors, namely, the rear camera 28, the rear right-side camera 30, and the right-side radar 34 are mutually consistent with each other.

If the CPU 14 determines in step S106 that the relative positions from the three sensors are mutually consistent with each other, the routine moves to the processing of step S110. If, on the other hand, the CPU 14 determines in step S106 that the relative positions from the three sensors are not mutually consistent with each other, the routine moves to the processing of step S108.

In step S110, utilizing the functions of the enhanced display unit 58, the CPU 14 provides an enhanced display at the relative position of the motorcycle 100. For example, as is shown in FIG. 7, the CPU 14 may provide an enhanced display by displaying a superimposed frame-shaped mark M. The CPU 14 then ends the display processing.

In contrast, in step S108, the CPU 14 determines whether or not the relative position of only one sensor is not consistent with the other relative positions. More specifically, in a case in which, utilizing the functions of the target position determination unit 54, the CPU 14 determines that the relative position from only one sensor among the coordinates for the motorcycle 100 acquired at the same timings from the three sensors is not consistent with the other relative positions, the routine moves to the processing of step S112. Moreover, in a case in which the CPU 14 determines in step S108 that the number of sensors having a relative positions are inconsistent is not just one sensor, in other words, if the CPU 14 determines that the relative positions are mutually different from each other in all three sensors, then the routine moves to the processing of step S116.

In step S112, utilizing the functions of the enhanced display unit 58, the CPU 14 provides an enhanced display at the relative positions after excluding the sensor that was not consistent with the others. For example, in a case in which the mounting position of the rear right-side camera 30 has become misaligned so that the relative position of the motorcycle 100 as detected by the rear right-side camera 30 is not consistent with the relative positions from the other sensors, the enhanced display unit 58 provides an enhanced display at a position that is calculated based on the relative positions detected by the rear camera 28 and the right-side radar 34.

Next, in step S114, utilizing the functions of the display processing unit 56, the CPU 14 switches the composite image 70D that was being displayed on the electronic interior mirror 38 to separate images. In other words, as is shown in FIG. 7, the first image 70A, the second image, and the third image 70C are displayed as individual images on the electronic interior mirror 38. Moreover, utilizing the functions of the warning display unit 60, the CPU 14 also displays the warning content 74 superimposed on the second image 70B that was acquired by the rear right-side mirror 30 at the electronic display unit 38. The CPU 14 then ends the display processing.

If it is determined in step S108 that the relative positions are mutually different from each other in all of the three sensors, then, in step S116, the CPU 14 provides an enhanced display based on the closest relative position. For example, in a case in which the relative positions detected by all of the sensors are mutually different from each other, and the relative position of the motorcycle 100 detected by the right-side radar 34 is the closest, then utilizing the functions of the enhanced display unit 58, the CPU 14 provides an enhanced display based on the relative position of the motorcycle 100 acquired from the right-side radar 34.

Next, in step S118, utilizing the functions of the display processing unit 56, the CPU 14 switches the composite image 70D that was being displayed on the electronic interior mirror 38 to separate images. In other words, as is shown in FIG. 8, the first image 70A, the second image, and the third image 70C are displayed as individual images on the electronic interior mirror 38. Moreover, utilizing the functions of the warning display unit 60, the CPU 14 also displays warning content superimposed on all of the images of the first image 70A, the second image 70B, and the third image 70C that correspond to sensors that have detected the target. Here, warning content is displayed superimposed on the first image 70A and the second image 70B. The CPU 14 then ends the display processing.

As has been described above, in the vehicle periphery monitoring device 10 according to the present exemplary embodiment, in a case in which it is determined by the target position determination unit 54 that the relative positions of a target are mutually consistent with each other in a plurality of sensors, the display processing unit 56 displays the single composite image 70D that is formed by combining together the first image 70A, the second image 70B, and the third image 70C at the electronic interior mirror 38. As a result, it is possible to easily recognize the position of a target traveling behind the vehicle 12.

Moreover, in a case in which it is determined by the target position determination unit 54 that the relative positions of the target are not mutually consistent with each other, the display processing unit 56 displays the first image 70A, the second image 70B, and the third image 70C respectively as individual images adjacent to each other on the display unit. By displaying individual images on the electronic interior mirror 38 in this way if the camera mounting position of any one of the rear camera 28, the rear right-side camera 30, and the rear left-side camera 32 is out of alignment, there is no possibility of a composite image containing a misaligned image being displayed on the electronic interior mirror 38. As a result, in a structure that displays composite images, it is possible to inhibit composite images that are incorrect because of camera misalignment from being displayed.

Furthermore, in the present exemplary embodiment, by providing an enhanced display of targets that are approaching the vehicle 12 via the enhanced display unit 58, it is possible to draw the attention of a vehicle occupant to the target. In particular, the enhanced display unit 58 of the present exemplary embodiment provides an enhanced display based on the relative positions of the target acquired from the remaining sensors after excluding the information from the sensor having a relative position for the target that was not consistent with that of the other sensors. As a result, it is possible to inhibit an enhanced display from being provided at an incorrect position.

Furthermore, in the present exemplary embodiment, in a case in which the relative positions of the sensors are all mutually different from each other, the enhanced display unit 58 provides an enhanced display based on the relative position of the target acquired from the sensor having a detected relative position of the target is the closest to the vehicle 12. As a result, information having a high degree of urgency can be made known to a vehicle occupant.

Moreover, in the present exemplary embodiment, by displaying warning content superimposed on the rear image acquired by the sensor having a mounting position has a possibility of being misaligned, it is possible to alert a vehicle occupant as to this possibility. Moreover, in a case in which the relative positions of the target detected by the rear camera 28, the rear right-side camera 30, and the rear left-side camera 32 are all mutually different from each other, warning content is displayed superimposed on all of the images of the first image 70A, the second image 70B, and the third image 70C that correspond to those sensors that have detected the target. As a consequence, because warning content are displayed superimposed on a plurality of images, it is possible to encourage a vehicle occupant to make a vehicle inspection or the like.

Furthermore, as is the case in the present exemplary embodiment, by detecting relative positions of a target using the right-side radar 34 and the left-side radar 36 for obstacle detection, there is no need to install dedicated sensors so that an increase in the number of components is inhibited.

The vehicle periphery monitoring device 10 according to the present exemplary embodiment has been described above, however, various modifications and the like may be made to the present disclosure insofar as they do not depart from the spirit or scope of the present disclosure. For example, as is shown in FIG. 1, the vehicle periphery monitoring device 10 of the above-described exemplary embodiment is an ECU that is mounted in the vehicle 12, however, the present disclosure is not limited to this, and it is also possible to employ a structure in which the vehicle periphery monitoring device 10 is provided externally to the vehicle 12. If the vehicle periphery monitoring device 10 is provided externally to the vehicle 12, then images acquired by the rear camera 28, the rear right-side camera 30, and the rear left-side camera 32 may be obtained via a network.

Moreover, in the above-described exemplary embodiment, the rear camera 28, the rear right-side camera 30, the rear left-side camera 32, the right-side radar 34, and the left-side radar 36 are used as sensors to detect the relative positions of a target, however, the present disclosure is not limited to this. For example, it is also possible to use a back guide monitor that is used to ensure there is a clear area behind a vehicle when that vehicle is reversing as a sensor. In addition, it is also possible to use LIDAR (Laser Imaging Detection And Ranging) that is used to detect peripheral information around a vehicle as a sensor. Furthermore, it is also possible for the relative positions of a target to be detected using only three sensors, namely, the rear camera 28, the rear right-side camera 30, and the rear left-side camera 32.

Furthermore, in the above-described exemplary embodiment, the enhanced display unit 58 provides an enhanced display by displaying the frame-shaped mark M superimposed on a target, however, the present disclosure is not limited to this. For example, it is also possible to display a predetermined mark superimposed on the target. Additionally, it is also possible for the mark to change as the target comes closer.

Furthermore, in the above-described exemplary embodiment, a structure that displays images on the electronic interior mirror 38 is used as a display unit, however, the present disclosure is not limited to this. For example, in addition to the electronic interior mirror 38, it is also possible to display a composite image on a center display or the like that is installed in the instrument panel.

Furthermore, it is also possible for the processing executed by the CPU 14 after reading software (i.e., a program) to instead be executed by various types of processors other than a CPU. Examples of other types of processors in this case include PLD (Programmable Logic Devices) whose circuit structure can be altered after manufacturing such as an FPGA (Field-Programmable Gate Array), and dedicated electrical circuits and the like which are processors having a circuit structure that is designed specifically in order to execute a particular processing such as ASIC (Application Specific Integrated Circuits). In addition, the display processing may be executed by just one type from among these various types of processors, or by a combination of two or more processors that are either the same type or are mutually different types (for example by a plurality of FPGA or by a combination of a CPU and an FPGA). Furthermore, the hardware structures of these different types of processors are, more specifically, electrical circuits obtained by combining circuit elements such as semiconductor elements and the like.

Moreover, in the above-described exemplary embodiment, the storage 20 is employed as a storage unit, however, the present disclosure is not limited to this. For example, it is also possible for the various types of programs to be stored on a non-transitory storage medium such as a CD (Compact Disk), a DVD (Digital Versatile Disk), and a USB (Universal Serial Bus) memory, and then distributed. Moreover, it is also possible to employ a system in which each program is downloaded from an external device via a network.

What is claimed is:

1. A host vehicle periphery monitoring device comprising: a plurality of sensors including a rear camera, a rear right-side camera, and a rear left-side camera; a display unit that is provided inside the host vehicle cabin; a memory; and a processor that is coupled to the memory, wherein
the processor is configured to:
acquire a rear image that includes a first image of the host vehicle rear side acquired by the rear camera, a second image of the host vehicle rear right-side acquired by the rear right-side camera, and a third image of the host vehicle rear left-side acquired by the rear left-side camera;
acquire, from the plurality of sensors, relative positions of a target that is present in areas including the host vehicle rear side, the host vehicle rear right-side, and the host vehicle rear left-side relative to the host vehicle;
determine whether or not the acquired relative positions of the target are mutually the same with each other in the plurality of sensors;
in a case in which it is determined that the relative positions of the target are mutually the same with each other, display, at the display unit, a single composite image that is created by combining the first image, the second image, and the third image; and
in a case in which it is determined that the relative positions of the target are not mutually the same with each other, display the first image, the second image, and the third image individually and adjacently to each other at the display unit.

2. The host vehicle periphery monitoring device according to claim 1, wherein the processor is configured so as to acquire the relative positions of the target from three or more sensors including the rear camera, the rear right-side camera and the rear left-side camera.

3. The host vehicle periphery monitoring device according to claim 2, wherein the processor is configured so as to provide an enhanced display of a target approaching the host vehicle in an image displayed at the display unit.

4. The host vehicle periphery monitoring device according to claim 3, wherein the processor is configured such that, in a case in which only a relative position of the target detected by just one sensor among the three or more sensors is not the same with the other relative positions, the processor causes an enhanced display to be provided at the display unit based on the relative positions of the target acquired from the remaining sensors after information from the one sensor has been excluded.

5. The host vehicle periphery monitoring device according to claim 3, wherein the processor is configured such that, in a case in which the relative positions of the target detected by all of the sensors among the three or more sensors are all mutually different from each other, the processor causes an enhanced display to be provided at the display unit based on a relative position of the target acquired from the sensor having a relative position of the target that is detected as being closest to the host vehicle.

6. The host vehicle periphery monitoring device according to claim 4, wherein the processor is configured such that, in a case in which only a relative position of the target detected by any one sensor among the rear camera, the rear right-side camera and the rear left-side camera is not the same with the other relative positions, the processor causes warning content to be displayed at the display unit superimposed on the rear image acquired by the one sensor.

7. The host vehicle periphery monitoring device according to claim 5, wherein the processor is configured such that, in a case in which the relative positions of the target detected by the rear camera, the rear right-side camera and the rear left-side camera are all mutually different from each other, the processor causes warning content to be displayed at the display unit superimposed on all of the images among the first image, the second image, and the third image which correspond to sensors that have detected the target.

8. The host vehicle periphery monitoring device according to claim 1, wherein the host vehicle periphery monitoring device is provided with sensors that include radar units that are provided in corner portions of the host vehicle body rear portion and detect the host vehicle rear-side obstacles, and the processor is configured so as to acquire the relative positions of the target from the sensors that are provided in the corner portions of the host vehicle body rear portion.

9. A host vehicle periphery monitoring method performed by a processor, in which, in the host vehicle periphery monitoring device comprising: a plurality of sensors including a rear camera, a rear right-side camera, and a rear left-side camera; a display unit that is provided inside the host vehicle cabin; a memory; and the processor that is coupled to the memory, the host vehicle periphery monitoring method comprising:
  acquiring a rear image that includes a first image of the host vehicle rear side acquired by the rear camera, a second image of the host vehicle rear right-side acquired by the rear right-side camera, and a third image of the host vehicle rear left-side acquired by the rear left-side camera;
  acquiring, from the plurality of sensors, relative positions of a target that is present in areas including the host vehicle rear side, the host vehicle rear right-side, and the host vehicle rear left-side relative to the host vehicle;
  determining whether or not the acquired relative positions of the target are mutually the same with each other in the plurality of sensors;
  in a case in which it is determined that the relative positions of the target are mutually the same with each other, displaying, at the display unit, a single composite image that is created by combining the first image, the second image, and the third image; and
  in a case in which it is determined that the relative positions of the target are not mutually the same with each other, displaying the first image, the second image, and the third image individually and adjacently to each other at the display unit.

10. The host vehicle periphery monitoring method according to claim 9, in which the processor acquires the relative positions of the target from three or more sensors including the rear camera, the rear right-side camera and the rear left-side camera.

11. The host vehicle periphery monitoring method according to claim 10, in which the processor provides an enhanced display of a target approaching the host vehicle in an image displayed at the display unit.

12. The host vehicle periphery monitoring method according to claim 11, in which, in a case in which only a relative position of the target detected by just one sensor among the three or more sensors is not the same with the other relative positions, the processor causes an enhanced display to be provided at the display unit based on the relative positions of the target acquired from the remaining sensors after information from the one sensor has been excluded.

13. The host vehicle periphery monitoring method according to claim 11, in which, in a case in which the relative positions of the target detected by all of the sensors among the three or more sensors are all mutually different from each other, the processor causes an enhanced display to be provided at the display unit based on a relative position of the target acquired from the sensor having a relative position of the target that is detected as being closest to the host vehicle.

14. A non-transitory storage medium storing a program executable by a processor that, in a host vehicle periphery monitoring device comprising: a plurality of sensors including a rear camera, a rear right-side camera, and a rear left-side camera; a display unit that is provided inside the host vehicle cabin; memory; and the processor that is coupled to the memory, performs the host vehicle periphery monitoring processing including:
  acquiring a rear image that includes a first image of the host vehicle rear side acquired by the rear camera, a second image of the host vehicle rear right-side acquired by the rear right-side camera, and a third image of the host vehicle rear left-side acquired by the rear left-side camera;
  acquiring, from the plurality of sensors, relative positions of a target that is present in areas including the host vehicle rear side, the host vehicle rear right-side, and the host vehicle rear left-side relative to the host vehicle;
  determining whether or not the acquired relative positions of the target are mutually the same with each other in the plurality of sensors;
  in a case in which it is determined that the relative positions of the target are mutually the same with each other, displaying, at the display unit, a single composite image that is created by combining the first image, the second image, and the third image; and
  in a case in which it is determined that the relative positions of the target are not mutually the same with each other, displaying the first image, the second image, and the third image individually and adjacently to each other at the display unit.

15. The non-transitory storage medium according to claim 14, the host vehicle periphery monitoring processing including acquiring the relative positions of the target from three or more sensors including the rear camera, the rear right-side camera and the rear left-side camera.

16. The non-transitory storage medium according to claim 15, the host vehicle periphery monitoring processing including providing an enhanced display of a target approaching the host vehicle in an image displayed at the display unit.

17. The non-transitory storage medium according to claim 16, wherein, in a case in which only a relative position of the target detected by just one sensor among the three or more sensors is not the same with the other relative positions, the host vehicle periphery monitoring processing includes causing an enhanced display to be provided at the display unit based on the relative positions of the target acquired from the remaining sensors after information from the one sensor has been excluded.

18. The non-transitory storage medium according to claim 16, wherein, in a case in which the relative positions of the target detected by all of the sensors among the three or more sensors are all mutually different from each other, the host vehicle periphery monitoring processing includes causing an enhanced display to be provided at the display unit based on a relative position of the target acquired from the sensor having a relative position of the target that is detected as being closest to the host vehicle.

* * * * *